US009323088B2

(12) United States Patent
     Tomomasa

(10) Patent No.: US 9,323,088 B2
(45) Date of Patent: Apr. 26, 2016

(54) DISPLAY DEVICE AND TELEVISION RECEIVER

(71) Applicant: Sharp Kabushiki Kaisha, Osaka (JP)

(72) Inventor: Masatoshi Tomomasa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/426,228

(22) PCT Filed: Sep. 5, 2013

(86) PCT No.: PCT/JP2013/073925
    § 371 (c)(1),
    (2) Date: Mar. 5, 2015

(87) PCT Pub. No.: WO2014/042061
    PCT Pub. Date: Mar. 20, 2014

(65) Prior Publication Data
    US 2015/0226997 A1    Aug. 13, 2015

(30) Foreign Application Priority Data
    Sep. 12, 2012 (JP) .................. 2012-200503

(51) Int. Cl.
    *H04N 5/64*     (2006.01)
    *G02F 1/1333*   (2006.01)
    *G02F 1/1335*   (2006.01)
    *G02F 1/1345*   (2006.01)
    *H04N 5/645*    (2006.01)
    *H04N 5/655*    (2006.01)

(52) U.S. Cl.
    CPC ........ *G02F 1/133308* (2013.01); *G02F 1/1336* (2013.01); *G02F 1/13452* (2013.01); *H04N 5/64* (2013.01); *H04N 5/645* (2013.01); *H04N 5/655* (2013.01); *G02F 2001/13332* (2013.01); *G02F 2001/133314* (2013.01); *G02F 2001/133325* (2013.01); *G02F 2201/465* (2013.01)

(58) Field of Classification Search
    CPC ......... H04N 5/645; H04N 5/655; H04N 5/64; G02F 1/133308; G02F 1/13452; G02F 1/1336; G02F 2001/13332; G02F 2001/133314; G02F 1/133325; G02F 2201/465
    USPC .......... 348/794, 739, 790, 789, 787; 345/204, 345/905
    IPC ..................................................... H04N 5/64
    See application file for complete search history.

(56) References Cited

U.S. PATENT DOCUMENTS

| 2015/0009419 A1* | 1/2015 | Hosoki | .................... H04N 5/64 348/794 |
| 2015/0098025 A1* | 4/2015 | Mouri | .................... H04N 5/64 348/790 |

FOREIGN PATENT DOCUMENTS

JP       2008-216844 A     9/2008

*Primary Examiner* — Sherrie Hsia
(74) *Attorney, Agent, or Firm* — Chen Yoshimura LLP

(57) ABSTRACT

A liquid crystal display device is equipped with: LEDs; a liquid crystal panel; printed boards; flexible substrates; a housing member; an outer frame having a panel pressing section and a side wall; and mounting members mounted on the side wall in a rotatable manner that mount the printed boards to the housing member. The mounting member is rotatable between a first position, where the printed board are locked, and a second position, where the mounting member is fixed to a surface of the housing member that is on a side opposite to a liquid crystal panel by rotating the mounting member from the first position against the side wall by bending the flexible substrates while the printed board is kept in a locked state.

13 Claims, 9 Drawing Sheets

DISPLAY DEVICE AND TELEVISION RECEIVER

TECHNICAL FIELD

The present invention relates to a display device and a television receiver.

BACKGROUND ART

In recent years, display elements of television receivers and other image display devices have been making a transition from conventional cathode-ray tube displays to thin-type display devices incorporating thin-type display elements such as liquid crystal display panels and plasma display panels, thus allowing image display devices to become thinner. A known example of such display devices is a display device described in Patent Document 1 below.

Patent Document 1 discloses a display device equipped with: a flat display element (display panel); a structure that is at least partially positioned on a side of one main surface of the flat display element; and a flexible substrate (such as a driver board and a flexible wiring line), whose base end is electrically connected to the flat display element and is projecting outward from the flat display element. The flexible substrate is provided with a fold-back portion that is folded back toward the side of one main surface of the flat display element and an attaching portion that is placed at the front end of the fold-back portion and is attached to the structure via an attaching member.

RELATED ART DOCUMENT

Patent Document

Patent Document 1: Japanese Patent Application Laid-Open Publication No. 2008-216844

Problems to be Solved by the Invention

In Patent Document 1, however, due to the flexibility of the flexible substrate, the attaching portion can be secured in a region that spans over a certain range on a surface of the structure on a side opposite to the flat display element. For this reason, in order to attach the attaching portion at a prescribed position, it is necessary to align the structure and the attaching portion while keeping the surface of the structure on the side opposite to the flat display element within view.

Meanwhile, a display device in some cases is assembled by laminating a display panel on top of an illumination device, which is constituted by a structure and the like. In such cases, when an attaching portion is attached to the structure, it is necessary to invert the display device before a flexible substrate is attached to the structure so as to make the surface of the structure on the side opposite to the flat display element viewable. As a result of the inversion, however, a driver board, a flexible wiring line, or the like may become damaged.

SUMMARY OF THE INVENTION

The present invention has been completed based on circumstances such as the one described above, and aims to provide a display device that makes it unnecessary to invert the display device during assembly so as to prevent the occurrence of a situation where a driver board, a flexible wiring line, or the like becomes damaged.

Means for Solving the Problems

A display device according to the present invention includes: a light source; a display panel that displays an image with light from the light source; a driver board that controls display operation of the display panel; flexible wiring that electrically connect the display panel to the driver board; a housing member that is disposed on a side opposite to a display surface side of the display panel where the display is realized and that houses at least the light source; a frame that holds, in a sandwiching manner, at least the display panel between the frame and the housing member, the frame having a panel pressing section that is disposed on the display surface side and that presses the display panel from the display surface side, and a side wall that extends from the panel pressing section to a side of the housing member; and a mounting member mounted on the side wall in a rotatable manner for mounting the driver board to the housing member, the mounting member being configured to rotate, with respect to the side wall, from a first position where the mounting member receives the driver board that has been connected to the flexible wiring, to a second position, where the mounting member is fixed to a rear external surface of the housing member while holding the driver board and while bending the flexible wiring, thereby mounting the driver board onto the housing member.

According to the display device described above, the mounting member that mounts the driver board on the housing member is rotatable between the first position and the second position. As a result, even if the driver board is mounted on the housing member while the surface of the housing member on the side opposite to the display panel is difficult to see, it is possible to perform the work of locking the driver board to the mounting member while the work at hand is visible in the first position, where the driver board is locked, and to fix the mounting member on the surface of the housing member on the side opposite to the display panel by rotating the mounting member against the side wall to the second position. This makes it possible to achieve excellent workability for fixing the driver board to the housing member.

Consequently, when a display device is assembled while the display panel side is easy to see, it is not necessary to invert the display device during assembly to make the surface of the housing member on the side opposite to the display panel easier to see while the driver board is mounted on the housing member, thereby preventing an occurrence of a situation where a driver board, a flexible wiring line, or the like is damaged as a result of inverting the display device during assembly.

For embodiments of the present invention, the following configurations are preferable:

(1) A movement of the mounting member is restricted in a direction that is perpendicular to a direction of rotation between the first position and the second position. With this configuration, it is possible to further improve workability for fixing the mounting member on the surface of the housing member on the side opposite to the display panel.

(2) A portion of the mounting member mounted on the side wall in a rotatable manner is a spherical pivot portion, and a bearing portion supporting the pivot portion is provided on a surface of the side wall on a side opposite to the panel pressing section. With this configuration, it is possible to mount the mounting member on the side wall in a rotatable manner in an easy configuration.

(3) A grooved portion extending in a direction of rotation of the mounting member and having a pair of side portions and a bottom portion is provided on a surface of the side wall on a side opposite to the panel pressing section, and the bearing portion is provided in the bottom portion of the grooved portion. With this configuration, the side portions of the grooved portion are able to restrict the movement of the mounting member in the direction perpendicular to the direction of rotation of the mounting member between the first position and the second position.

(4) A portion of the mounting member that is fixed to a surface of the housing member on a side opposite to the display panel is a fitting portion that is fitted to the housing member in a direction of rotation of the mounting member. With this configuration, it is possible to fix the mounting member to the housing member via the fitting portion by rotating the mounting member from the first position to the second position, and further improve workability for mounting the driver board to the housing member.

(5) A portion of the mounting member that locks the driver board is a housing portion that houses the driver board, and the housing portion has a base portion and a pair of locking pieces that respectively lock one end of the driver board and another end of the driver broad in a sandwiching manner between the pair of locking pieces and the base portion. With this configuration, it is possible to lock the driver board to the mounting member in an easy configuration.

(6) The housing portion houses the driver board in the first position while the driver board that is connected to the flexible wiring is hanging down due to weight. With this configuration, it is possible to house the driver board in the housing portion easily and achieve excellent workability for locking the driver board to the mounting member.

(7) A plurality of the flexible wiring parallel to one another are connected to the driver board along the one end, and the locking pieces lock the driver board at portions between the flexible wiring parallel to one another. With this configuration, it is possible to avoid a situation where the flexible wiring line and the mounting member interfere with each other.

(8) End surfaces of the pair of locking pieces facing each other have tapering surfaces that gradually become narrow in a direction toward where the driver board is housed. With this configuration, it is possible to house the driver board in the housing portion even more easily and achieve excellent workability for locking the driver board to the mounting member.

(9) The display device also includes a frame-shaped panel supporting member that is interposed between the display panel and the housing member and that has a panel supporting surface supporting a surface on a side opposite to the display surface of the display panel, wherein the flexible wiring is connected to the respective display panel on one panel surface of the display panel, and wherein the panel supporting member protrudes from the panel supporting surface, with a protruding end thereof disposed in a same plane as the one panel surface and a wiring supporting portion supporting the flexible wiring. With this configuration, it is possible to prevent an unforeseeable load from being applied to connecting portions between the display panel and the flexible wiring lines by having the wiring supporting portion support the flexible wiring lines, and improving the reliability of connection between the display panel and the flexible wiring lines.

(10) In the first position, the mounting member is disposed along a direction in which the side wall is extended, and, in the second position, the mounting member is disposed in a position rotated 90 degrees from the direction in which the side wall is extended. With this configuration, it is possible to mount the driver board on the housing member in an easy configuration and further improve workability for mounting the driver board on the housing member.

Additionally, a liquid crystal display panel can be used as an example of the display panel described above. Such a display device can be used as a liquid crystal display panel in a wide variety of applications, including displays for television sets and personal computers, and is particularly suitable for large-screen displays.

Effects of the Invention

With the present invention, it is possible to provide a display device capable of preventing a situation where a driver board, a flexible wiring line, or the like becomes damaged.

DETAILED DESCRIPTION OF EMBODIMENTS

<Embodiment 1>

Embodiment 1 will be explained with reference to diagrams. In the present embodiment, a liquid crystal display device (an example of display devices) 10 will be used as an example. A part of each diagram indicates an x-axis, a y-axis, and a z-axis, which are illustrated so that the axis directions are common to all diagrams. Among these axis directions, the y-axis direction matches the vertical direction while the x-axis direction matches the horizontal direction. Additionally, top and bottom will be indicated based on the vertical direction, unless otherwise noted.

Figure 1:
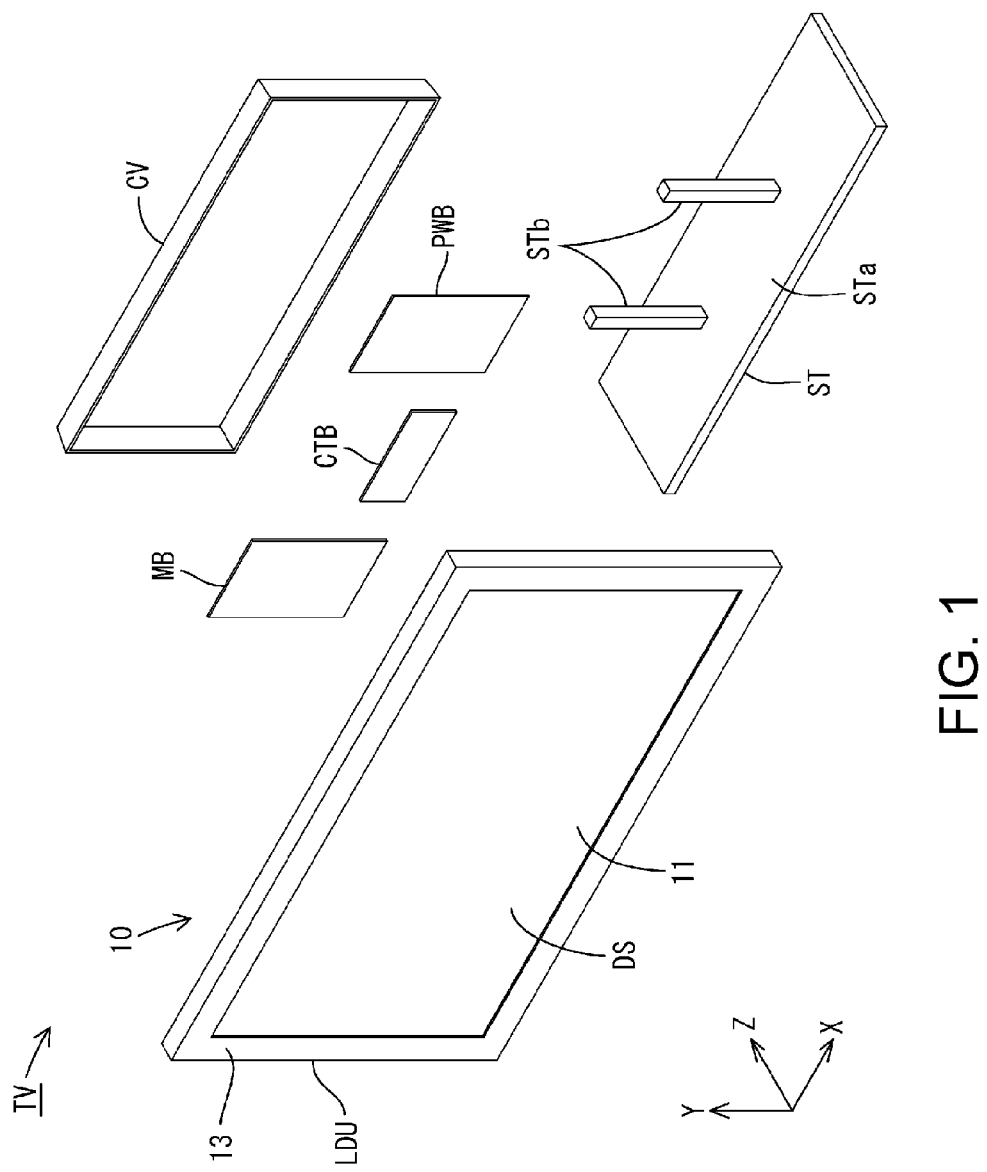
FIG. 1 is an exploded perspective view showing a schematic configuration of a television receiver TV and a liquid crystal display unit LDU pertaining to Embodiment 1.
Figure 2:
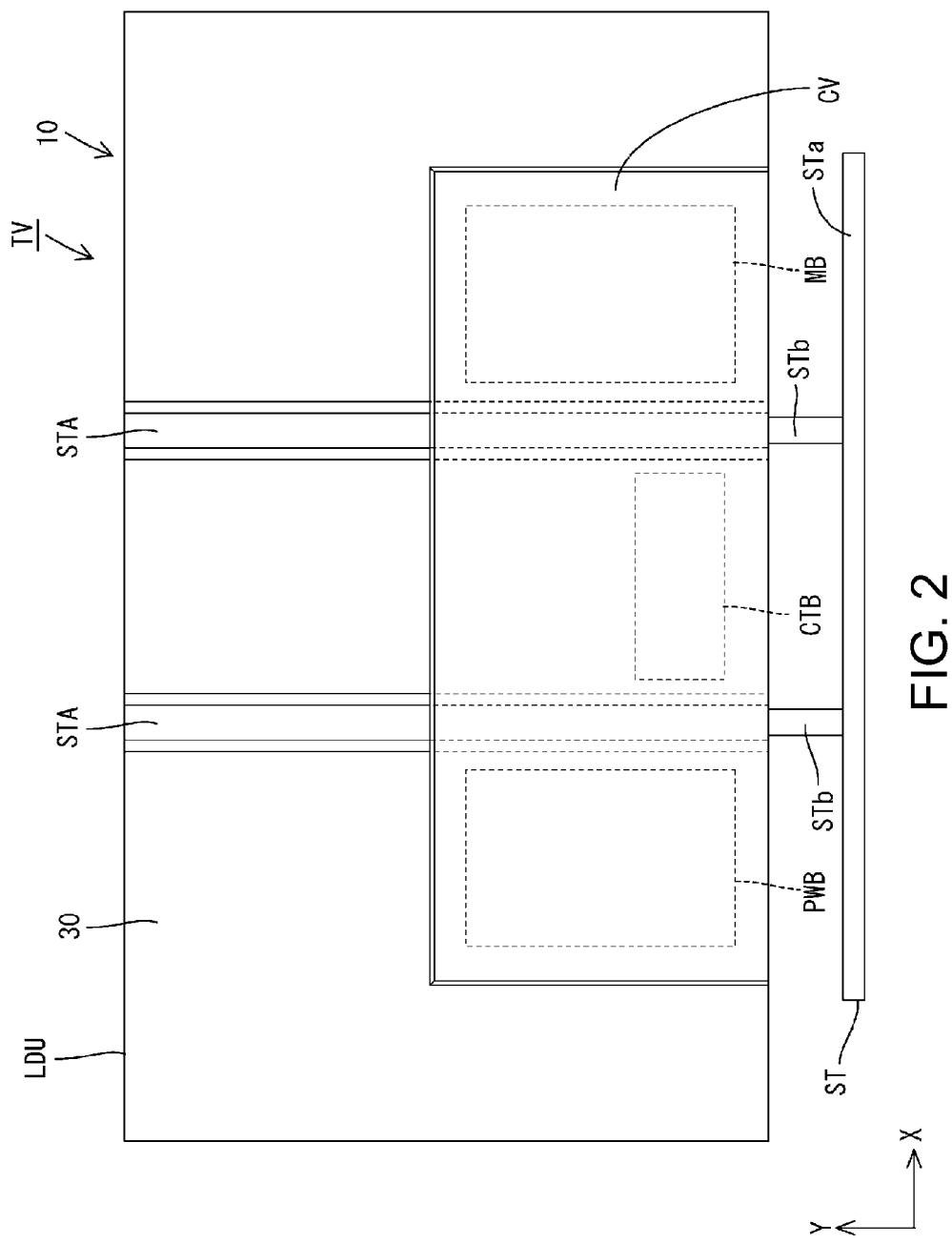
FIG. 2 is a reverse view of the television receiver TV and a liquid crystal display device 10.

As shown in FIG. 1, a television receiver TV is equipped with: a liquid crystal display unit LDU; boards PWB, MB, and CTB mounted on a reverse surface side (back surface side) of the liquid crystal display unit LDU; a cover member CV that is mounted on the reverse surface side of the liquid crystal display unit LDU so as to cover the boards PWB, MB, and CTB; and a stand ST. The television receiver TV is held by the stand ST so that a display surface of the liquid crystal display unit LDU is extended along the vertical direction (the y-axis direction). A liquid crystal display device 10 pertaining to this embodiment is the television receiver TV configured as described above excluding at least a configuration for receiving television signals (such as a tuner portion of a main board MB). As shown in FIG. 2, the liquid crystal display unit LDU assumes a horizontally long rectangular shape (rectangular shape; long shape) as a whole, and is equipped with a liquid crystal panel 11, which is a display panel, and a backlight device 12, which is an external light source. The liquid crystal display unit LDU is configured such that these components are held as one unit by an outer frame 13 and a housing member 30, which are exterior members constituting an exterior of the liquid crystal display device 10.

First, a configuration of the reverse surface side of the liquid crystal display device 10 will be described. On the reverse surface of the liquid crystal display device 10, as shown in FIG. 2, a pair of stand mounting members STA extending along the y-axis direction is mounted at two positions spaced apart along the x-axis direction. The cross-sections of these stand mounting members STA are substantially channel-shaped opened to the side of the housing member 30, so that a pair of supports Stb of the stand ST can be inserted into the spaces between the stand mounting members STA and the housing member 30. In the spaces within the stand mounting members STA, wiring members (such as electric lines) connected to LED substrates 18 (light source substrates) of the backlight device 12 are also passed through. The stand ST is constituted by: a base STa aligned parallel to the x-axis direction and the z-axis direction; and the pair of supports Stb standing along the y-axis direction from the base STa. The cover member CV, made of a synthetic resin, is mounted so as to cover an approximately lower half of the reverse surface of the liquid crystal display device 10 shown in FIG. 2 while cutting across the pair of stand mounting members STA in the x-axis direction. Held between this cover member CV and the liquid crystal display device 10 is a component housing space that is capable of housing components such as the boards PWB, MB, and CTB, which will be described next.

As shown in FIG. 2, the boards PWB, MB, and CTB include a power supply board PWB, a main board MB, and a control board CTB. The power supply board PWB can be described as a power supply source of the liquid crystal display device 10 that is capable of supplying driving power to other boards MB and CTB, as well as to LEDs 17 (light source) of the backlight device 12. Therefore, it can be said that the power board supply PWB also serves as an "LED driver board driving the LEDs 17." The main board MB has, at least, a tuner portion that is capable of receiving television signals and an image processing portion that processes the received television signals into images (neither the tuner portion nor the image processing portion is illustrated), and is capable of outputting the processed image signals to the control board CTB, which will be described next. Note that if the liquid crystal display device 10 is connected to an external image playback device not shown in the diagram, inputs of image signals are received from the image playback device. The main board MB can then process the image signals in the image processing portion and output the image signals to the control board CTB. The control board CTB has a function of converting the image signals inputted by the main board into signals for driving liquid crystals and supplying the liquid crystal panel 11 with the converted signals for driving liquid crystals.

Figure 3:
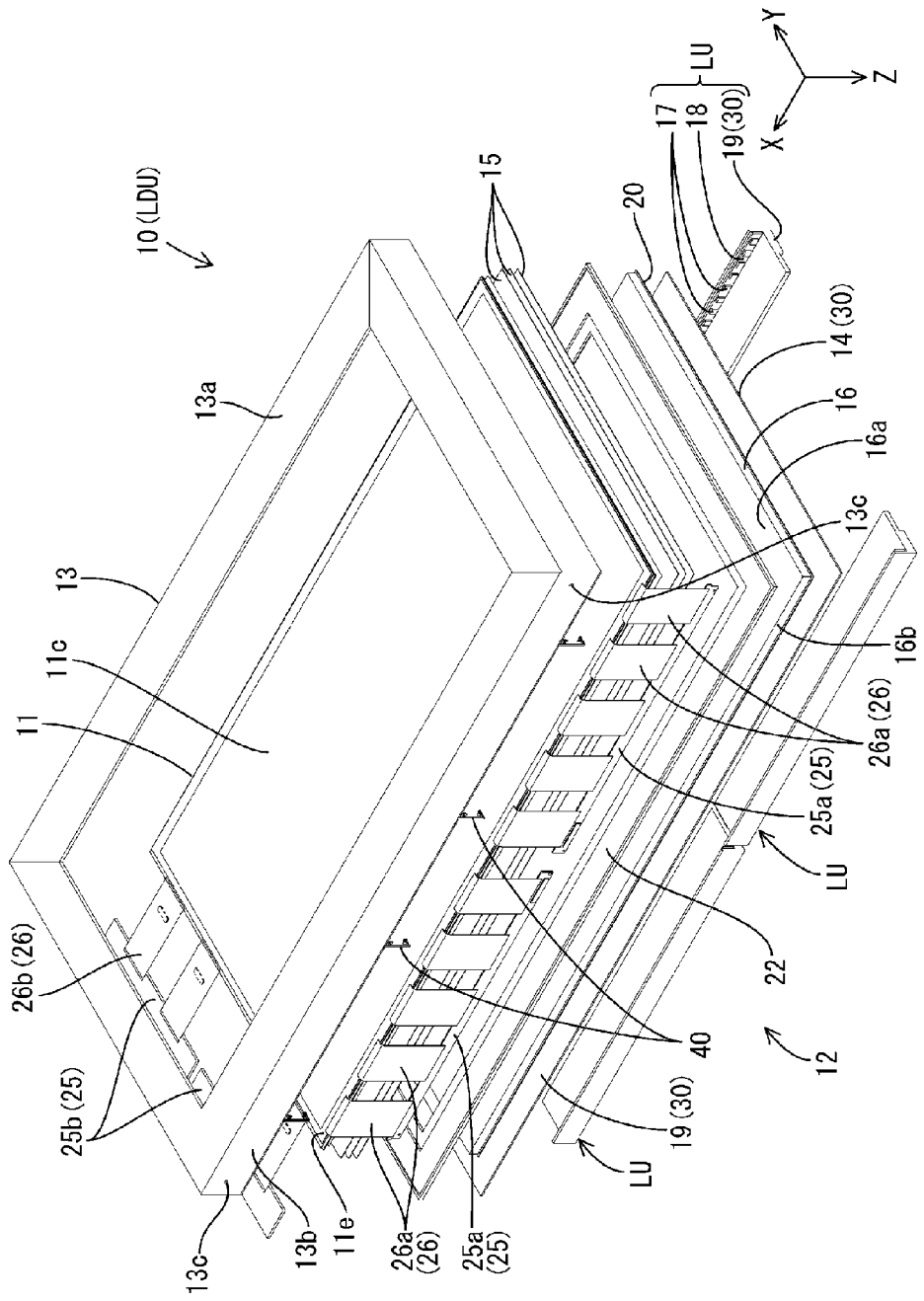
FIG. 3 is an exploded perspective view showing a schematic configuration of the liquid crystal display unit LDU constituting the liquid crystal display device 10.

As shown in FIG. 3, the main components of the liquid crystal display unit LDU, which constitutes a portion of the liquid crystal display device 10, are housed inside a space between the outer frame 13, which constitutes the exterior of the front side, and the housing member 30, which constitutes the exterior of the reverse side. The housing member 30 is constituted by heat dissipation members 19 and a chassis 14, which will be described later. The main components housed inside the outer frame 13 and the housing member 30 include, at least, the liquid crystal panel 11, optical members 15 (optical sheets), a light guide plate 16, an inner frame 22 (panel supporting member), and LED units LU. Among these, the liquid crystal panel 11, the optical members 15, and the light guide plate 16 are held such as to be sandwiched by the outer frame 13 on the front side and the housing member 30 on the reverse side, while being stacked onto each other. The backlight device 12 consists of the inner frame 22, the light guide plate 16, the LED units LU, and the chassis 14 (the housing member 30), and is a configuration of the aforementioned liquid crystal display unit LDU excluding the liquid crystal panel 11, the optical sheets 15, and the outer frame 13. The LED units LU, which constitute a portion of the backlight device 12, are disposed in a pair so as to sandwich the light guide plate 16 from both ends of the short side direction thereof (the y-axis direction). The LED unit LU consists of: the LEDs 17, the light source; the LED substrate 18, on which the LEDs 17 are mounted; and the heat dissipation member 19 to which the LED substrate 18 is attached. Note that the heat dissipation member 19 pertaining to the present invention constitutes a portion of the LED unit LU as well as a portion of the housing member 30. Each of the components will be described below.

As shown in FIG. 3 and other figures, the liquid crystal panel 11 assumes the shape of a horizontally long rectangle in plan view. The liquid crystal panel 11 is configured such that a pair of glass substrates 11a and 11b with superior transparency is attached together with a prescribed gap therebetween and liquid crystals are sealed between the substrates 11a and 11b. Of the pair of substrates 11a and 11b, the one on the front side (front surface side) is a color filter (hereinafter, "CF") substrate 11a, and the one on the reverse side (back surface side) is an array substrate 11b. Provided on the array substrate 11b are: switching elements (for example, thin film transistors: TFTs) connected to source wiring lines and gate wiring lines that cross each other at right angles; pixel electrodes connected to the switching elements; an alignment film; and the like. More particularly, a plurality of TFTs and pixel electrodes are provided alongside one another on the array substrate 11b, while a plurality of gate wiring lines and source wiring lines are arranged in a grid pattern so as to surround these TFTs and pixel electrodes. The gate wiring lines and the source wiring lines are respectively connected to the gate electrodes and the source electrodes of the TFTs, and the pixel electrodes are connected to the drain electrodes of the TFTs. Additionally provided on the array substrate 11b are capacitance wiring lines (auxiliary capacitance wiring lines; storage capacitance wiring lines; Cs wiring lines) that are parallel to the gate wiring lines while overlapping the pixel electrodes in plan view, with the capacitance wiring lines and the gate wiring lines arranged alternately in the y-axis direction. On the other hand, the CF substrate 11a is provided with: color filters on which color portions such as R (red), G (green), and B (blue), are respectively arranged in a prescribed sequence; a counter electrode; an alignment film; and the like. Additionally, polarizing plates (not illustrated) are respectively provided on the outside of both of the substrates 11a and 11b.

Figure 4:
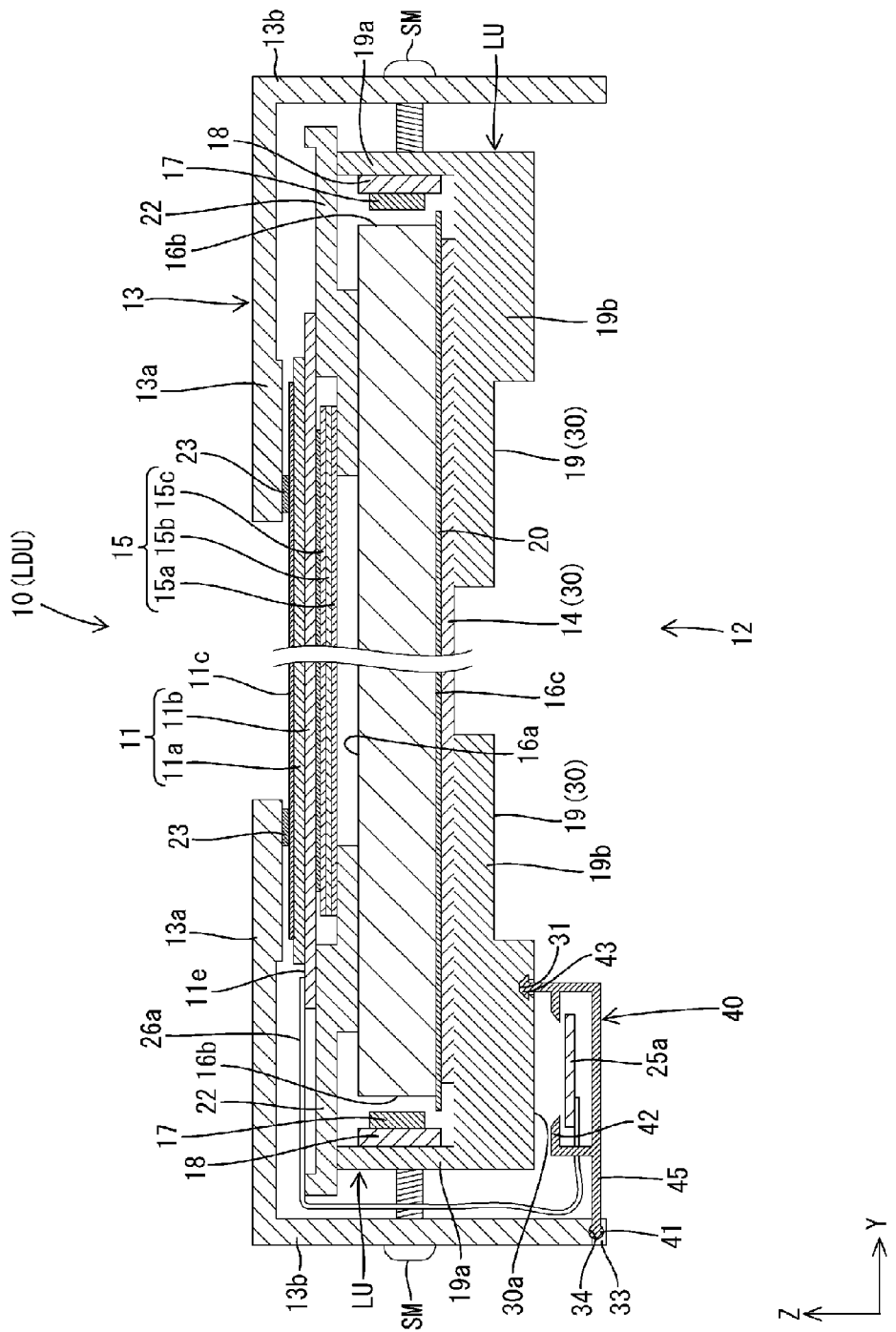
FIG. 4 is a cross-sectional view showing a cross-sectional configuration of the liquid crystal display device 10 along a short side direction thereof.

Of the pair of substrates 11a and 11b constituting the liquid crystal panel 11, the array substrate 11b is larger than the CF substrate 11a in plan view, as shown in FIG. 4. The array substrate 11b is arranged such that the edges thereof protrude outward from the edges of the CF substrate 11a. More particularly, the array substrate 11b is made larger than the CF substrate 11a such that the outer edges thereof protrude outward over the entire periphery from the outer edges of the CF substrate 11a. Of a pair of long side edges constituting the outer edges of the array substrate 11b, the long side edge on the side of the control board CTB of the y-axis direction (the foreground side in FIG. 3; the left side in FIG. 4) is provided with a plurality of source-side terminal portions (not illustrated) drawn out from the aforementioned source wiring lines. Each of the source-side terminal portions is connected to a flexible substrate 26a (flexible wiring line) as shown in FIG. 3. A plurality of flexible substrates 26a are arranged with gaps therebetween along the x-axis direction (in other words, in the direction along the long side edges of the array substrate 11b). Each flexible substrate 26a protrudes outward along the y-axis direction from a long side edge of the array substrate 11b.

On the other hand, on one of a pair of short side edges (the farther side in FIG. 3) constituting the outer edges of the array substrate 11b, a plurality of gate-side terminal portions (not illustrated) drawn out from the aforementioned gate wiring lines and the capacitance wiring lines are provided. Each of the gate-side terminal portions is connected to a flexible substrate 26b (flexible wiring line). A plurality of flexible substrates 26b are arranged with gaps therebetween along the y-axis direction (in other words, in the direction along the short side edges of the array substrate 11b). Each flexible substrate 26b is projected outward along the x-axis direction from a short side edge of the array substrate 11b.

Each of the flexible substrates 26a and 26b is equipped with: a film base material made of a synthetic resin material (a polyimide resin, for example) having an insulating property and a flexible property; and a driver for driving liquid crystals mounted on the base material. A plurality of wiring patterns (not illustrated) are formed on the base material of each of the flexible substrates 26a and 26b, and are connected to the driver that is mounted near the center of the base material. In the case of the present embodiment, each of the flexible substrates 26a and 26b, on which the aforementioned driver is mounted, is constituted by a so-called SOF (System on Film). One end of the flexible substrate 26a is connected by pressure bonding, via an anisotropic conductive film (ACF), to a source-side terminal portion provided on one panel surface 11e of the array substrate 11b, while the other end thereof is connected by pressure bonding, via an anisotropic conductive film (ACF), to a terminal portion (not illustrated) constituting a printed board 25a (driver board) on the source side, which will be described later. The printed board 25a is connected to the aforementioned control board CTB via wiring members not shown in diagrams. The printed board 25a transmits signals inputted by the control board CTB (such as scanning signals to the gate wiring lines, data signals to the source wiring lines, and capacitance signals to the capacitance wiring lines) to the flexible substrates 26a. Here, the printed board 25a assumes a long shape (band shape). In the case of the present embodiment, two printed boards 25a are used and are connected to each flexible substrate 26a such that the printed boards 25a are lined up alongside each other in a single row. The length of one printed board 25a is set to approximately one half of the long side of the liquid crystal panel 11. In contrast, one end of the flexible substrate 26b is connected by pressure bonding, via an anisotropic conductive film (ACF), to a gate-side terminal portion provided on the one panel surface 11e of the array substrate 11b, while the other end of the flexible substrate 26b is connected by pressure bonding, via an anisotropic conductive film (ACF), to a terminal portion (not illustrated) constituting a printed board 25b (driver board) on the gate side. The printed board 25b assumes a long shape (band shape). In the case of the present embodiment, two printed boards 25b are used and are connected to each flexible substrate 26b such that the printed boards 25a are lined up alongside each other in a single row. The length of one printed board 25b is set to approximately one half of the short side of the liquid crystal panel 11. On the array substrate 11b, relay wiring lines (not illustrated) connecting the source-side terminal portions and the gate-side terminal portions are formed. Through these relay wiring lines, signals inputted by the control board CTB (such as scanning signals to the gate wiring lines and capacitance signals to the capacitance wiring lines) are transmitted to the gate-side terminal portions, the flexible substrates 26b, and the printed boards 25b. In this configuration, the liquid crystal panel 11 displays images on a display surface 11c thereof based on the signals inputted by the control board CTB. The printed boards 25a and 25b are attached to the housing member 30 via mounting members 40. The manner of mounting the printed boards 25a to the housing member 30, as well as the mounting members 40, will be described later. Additionally, the printed boards 25a and 25b will be called printed board(s) 25 (driver board(s)) when collectively referred to, and the flexible substrates 26a and 26b will be called flexible substrate(s) 26 (flexible wiring line(s)) when collectively referred to.

Figure 5:
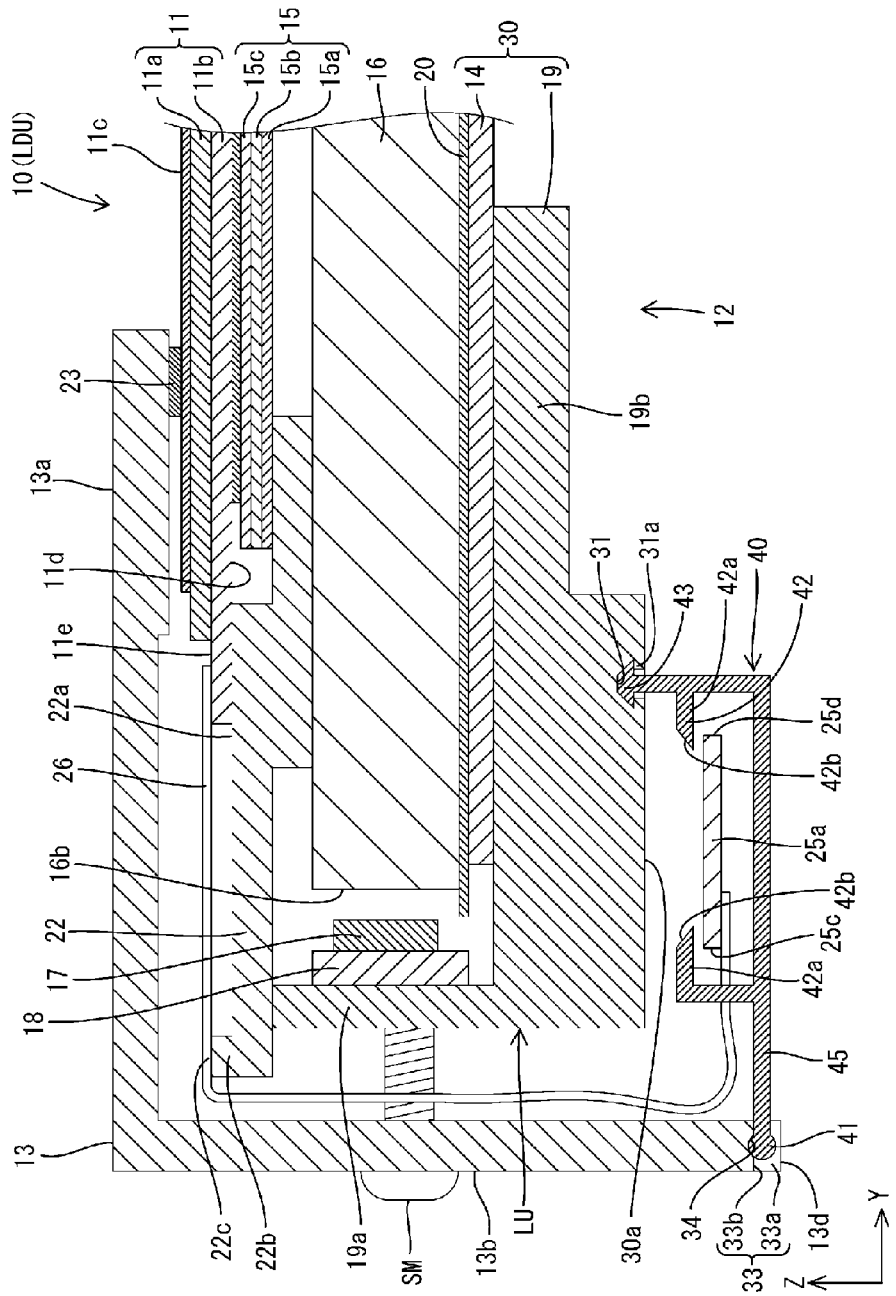
FIG. 5 is an enlarged view of a vicinity of one LED unit LU in FIG. 4, showing a cross-sectional view of main parts of a backlight device 12 (showing a mounting member 40 in a second position).

As shown in FIGS. 3 to 5, the liquid crystal panel 11 is laminated onto the front side (the light exiting side) of the optical members 15, which will be described later. A surface on the reverse side of the liquid crystal panel 11 (outer surface of the polarizing plate on the reverse side) is adhered to the optical members 15 with almost no space therebetween. This prevents dust, debris, or the like from entering between the liquid crystal panel 11 and the optical members 15. The display surface 11c (plate surface on the front side) of the liquid crystal panel 11 is constituted by: a display region in the center of the screen capable of displaying images; and a frame-shaped (frame-shaped) non-display region found in the outer edges of the screen surrounding the display region. Each of the aforementioned terminal portions and the flexible substrates 26 described above is placed in the non-display region.

As shown in FIG. 3, the optical members 15 assume a horizontally long rectangular shape in a manner similar to the liquid crystal panel 11 in plan view, and are comparable to the liquid crystal panel 11 in size (short side dimensions and long side dimensions). The optical members 15 are placed so as to be layered over the front side (the light exiting side) of the light guide plate 16, which will be described later, and are disposed such as to be sandwiched between the aforementioned liquid crystal panel 11 and the inner frame 22, which is disposed on the front side of the light guide plate 16. Three optical members 15, all sheet-like, are disposed such as to be laminated onto one another, and are specifically constituted by, from the reverse side (the side of the light guide plate 16): a diffusion sheet 15a, a lens sheet (prism sheet) 15b, and a reflective polarizing sheet 15c. The sizes of the three sheets 15a, 15b, and 15c are nearly equal in plan view.

Next, the outer frame 13 (frame), which presses the aforementioned liquid crystal panel 11 from the front side and also constitutes the exterior members, will be described. The outer frame 13 is made of a metal such as aluminum, and is higher in mechanical strength (rigidity) and thermal conductivity than if made of a synthetic resin, for example. The outer frame 13 has a horizontally long, rim-like shape as a whole so as to surround the display region of the display surface 11c of the liquid crystal panel 11, as shown in FIGS. 3 and 4. The outer frame 13 is constituted by: a panel pressing section 13a that is parallel to the display surface 11c of the liquid crystal panel 11 and presses the liquid crystal panel 11 from the front side; and a side wall 13b, which protrudes toward the reverse side from the outer edges of the panel pressing section 13a. The outer frame 13 has a substantially L shape in cross section. Of these, the panel pressing section 13a assumes a horizontally long, rim-like shape along the outer edges (non-display region; frame portion) of the liquid crystal panel 11 and is capable of pressing the outer edges of the liquid crystal panel 11 over almost the entire periphery from the front side. Note that buffer materials 23 are provided between the panel pressing section 13a and the liquid crystal panel 11. An outer surface of the panel pressing section 13a facing the front side (a surface on the side opposite to the surface facing the liquid crystal panel 11) is exposed to the outside on the front side of the liquid crystal display device 10 in a manner similar to the display surface 11c of the liquid crystal panel 11, thereby constituting the front surface of the liquid crystal display device 10 together with the display surface 11c of the liquid crystal panel 11.

Figure 6:
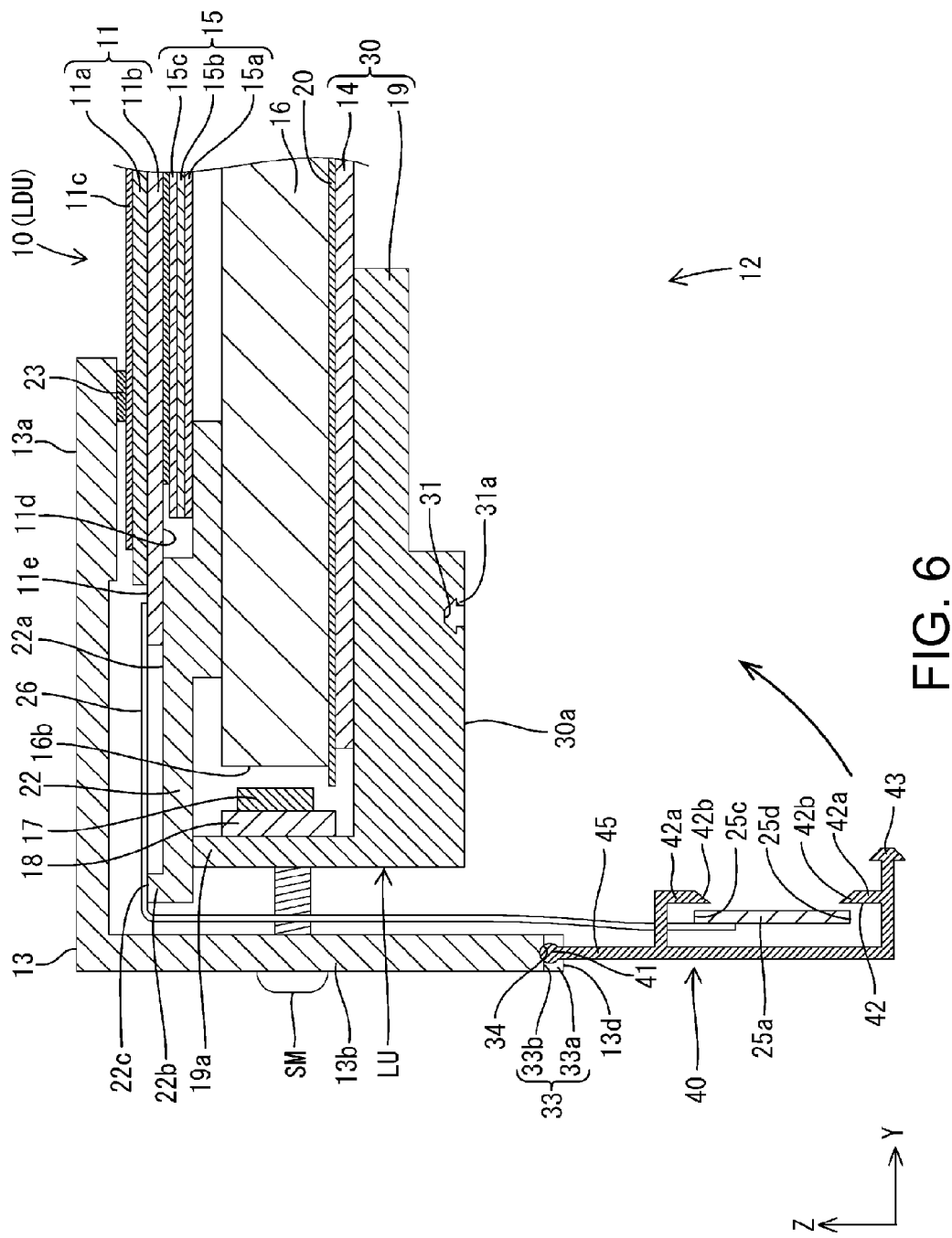
FIG. 6 is a cross-sectional view of the main parts showing the mounting member 40 in a first position.

The side wall 13b takes the shape of a plate that extends from the outer edges of the panel pressing section 13a to the reverse side (the side of the housing member 30). The side wall 13b surrounds the backlight device 12 (the inner frame 22 and the housing member 30) over the entire periphery. The outer surfaces of the side wall 13b along the periphery of the liquid crystal display device 10 are exposed to the outside along the periphery of the liquid crystal display device 10, constituting the top surface, the bottom surface, and the side surfaces of the liquid crystal display device 10. Formed on the side wall 13b are screw insertion holes 13c, from which screw members SM are inserted from the side as shown in FIG. 3. The screw insertion holes 13c are formed on each of the long sides of the side wall 13b at both ends of the x-axis direction. As shown in FIGS. 5 and 6, the mounting member 40 is mounted in a rotatable manner on an end surface of the side wall 13b on a side opposite to the panel pressing section 13a, or a reverse surface 13d of the side wall 13b. A configuration in which the mounting member 40 is mounted on the side wall 13b will be described later.

Next, each component of the backlight device 12 will be described. The light guide plate 16 is made of a synthetic resin with a refractive index that is sufficiently higher than that of air and that is nearly transparent (superior in transparency) (for example: acrylic resin such as PMMA, and polycarbonate). As shown in FIG. 3, the light guide plate 16 has a horizontally long rectangular shape in plan view in a manner similar to the liquid crystal panel 11 and the optical members 15 and takes the shape of a plate that is thicker than the optical members 15. The long side direction and the short side direction of the main surfaces of the light guide plate 16 respectively match the x-axis direction and the y-axis direction, while the plate thickness direction orthogonal to the main surfaces matches the z-axis direction. The light guide plate 16 is layered over the reverse side of the optical members 15 and is disposed such as to be sandwiched between the optical members 15 and the chassis 14. As shown in FIG. 4, at least the short side dimensions of the light guide plate 16 are larger than the short side dimensions of the liquid crystal panel 11 and the optical members 15, respectively, and both ends of the short sides (both ends along the long side direction) are disposed so as to protrude outward from both ends of the liquid crystal panel 11 and the optical members 15 (so as not to overlap in plan view). The light guide plate 16 is disposed such as to be sandwiched, along the y-axis direction, by the pair of LED units LU that are arranged on both sides of the short side direction of the light guide plate 16, so that light from the LEDs 17 is introduced from both ends of the short side direction respectively. The light guide plate 16 has a function of transmitting light from the LEDs 17 introduced from both ends of the short side direction while redirecting light toward the optical members 15 side (front side) to exit therefrom.

Of the main surfaces of the light guide plate 16, the surface facing the front side (the surface facing the optical members 15) is a light exiting surface 16a, from which light from the inside exits toward the optical members 15 and the liquid crystal panel 11. Of the outer end faces that are adjacent to the main surfaces of the light guide plate 16, both of the end surfaces of the long sides extending along the x-axis direction (the end faces found at both ends of the short side direction) respectively face the LEDs 17 (LED substrates 18) with a prescribed space therebetween. These are a pair of light incident surfaces 16b, from which light emitted by the LEDs 17 enters. The light incident surfaces 16b are aligned parallel to the x-axis direction and the z-axis direction (the main plate surfaces of the LED substrates 18), and are substantially orthogonal to the light exiting surface 16a. Additionally, the direction in which the LEDs 17 and the light incident surfaces 16b are lined up coincides with the y-axis direction and is parallel to the light exiting surface 16a.

As shown in FIG. 4, on a surface 16c on the reverse side of the light guide plate 16, or a surface on the side opposite to the light exiting surface 16a (a surface facing the chassis 14), a reflective sheet 20 that is capable of reflecting light exiting from the surface 16c to the outside of the reverse side and redirecting light to the front side is provided such as to cover the surface 16c almost over the entire area. In other words, the reflective sheet 20 is disposed such as to be sandwiched between the chassis 14 and the light guide plate 16. This reflective sheet 20 is made of a synthetic resin and the surface takes on a white color that is superior in light reflectivity. The short side dimensions of the reflective sheet 20 are larger than the short side dimensions of the light guide plate 16, and both of the ends are disposed so as to protrude closer to the LEDs 17 than the light incident surfaces 16b of the light guide plate 16. These protruded portions of the reflective sheet 20 make it possible to efficiently reflect light moving obliquely from the LEDs 17 toward the side of the chassis 14 and to redirect light toward the light incident surfaces 16b of the light guide plate 16. Note that on one or both of the light exiting surface 16a and the opposing surface 16c of the light guide plate 16, reflective portions (not illustrated) that reflect light on the inside or scattering portions (not illustrated) that scatter light on the inside are patterned to a prescribed in-plane distribution, so that light exiting from the light exiting surface 16a is controlled and evenly distributed in the plane.

As shown in FIGS. 3 and 4, the inner frame 22 (panel supporting member) is formed in a horizontally long, rim-like shape (frame-like shape) as a whole in a manner similar to the outer frame 13. The inner frame 22 is made of a synthetic resin and has a light shielding property by virtue of having a black surface, for example. The inner frame 22 is configured so as to be able to press, from the front side, the outer edges of the light guide plate 16 as well as light source mounted portions 19a of the heat dissipation members 19, while supporting almost the entire outer edges of the liquid crystal panel 11 and the optical members 15 respectively from the reverse side. As shown in FIG. 5, a panel supporting surface 22a of the inner frame 22 that supports a surface 11d on a side opposite to the display surface 11c of the liquid crystal panel 11 is protruded toward the front side in a stepwise manner from an inner side portion that supports the outer edges of the optical members 15. The inner frame 22 has a wiring supporting portion 22b that protrudes outward from the panel supporting surface 22a. The protruding end surface 22c of the wiring supporting portion 22b is disposed in the same plane as the one panel surface 11e on which the source-side terminal portions and gate-side terminal portions are provided, and supports each of the flexible substrates 26a and 26b.

Next, the LED 17, the LED substrate 18, and the heat dissipation member 19 that constitute the LED unit LU will be explained in order. As shown in FIGS. 3 and 4, the LED 17, which constitutes the LED unit LU, is configured by sealing an LED chip using a resin material on a substrate portion to be attached to the LED substrate 18. The LED chip to be mounted on the substrate portion has one type of principal emission wavelength. More specifically, an LED chip that emits a blue monochromic light is used. On the other hand, fluorescent substances that emit prescribed colors when excited by the blue light emitted by the LED chip are dispersed and blended on the resin material that seals the LED chip, and emit a substantially white color as a whole. With respect to the fluorescent substances, a yellow fluorescent substance that emits a yellow color, a green fluorescent substance that emits a green color, and a red fluorescent substance that emits a red color, for example, can be used in any combination or individually. The LED 17 is a so-called top surface light-emitting type that has a principal light-emitting surface on a side opposite to the surface that is mounted on the LED substrate 18 (a surface facing the light incident surface 16b of the light guide plate 16).

The heat dissipation member 19 that constitutes the LED unit LU is made of a metal with superior heat conductivity such as aluminum, for example. As shown in FIGS. 3 and 4, the heat dissipation member 19 is equipped with: a light source mounted portion 19a on which the LED substrate 18 is mounted; and a heat dissipation portion 19b having a front surface (a plate surface facing the chassis 14 side) that is in direct contact with a plate surface of the chassis 14 and a reverse surface (a surface on the side opposite to the liquid crystal panel 11) that is exposed on the back surface side of the liquid crystal display device 10. These components are bent into a substantially L shape from a cross-sectional view. The length dimension of the heat dissipation material 19 is nearly equal to the length dimension of the aforementioned chassis 14.

As shown in FIG. 4, the light source mounted portion 19a takes the shape of a plate that is parallel to the plate surface of the LED substrate 18 and the light incident surface 16b of the light guide plate 16, with the long side direction, the short side direction, and the thickness direction thereof respectively matching the x-axis direction, the z-axis direction, and the y-axis direction. The LED substrate 18 is mounted on a plate surface on the inner side of the light source mounted portion 19a, or the plate surface facing the light guide plate 16 side. While the long side dimensions of the light source mounted portion 19a are roughly equal to the long side dimensions of the LED substrate 18, the short side dimensions of the light source mounted portion 19a are larger than the short side dimensions of the LED substrate 18. As a result, both ends of the short side direction of the light source mounted portion 19a protrude outward from both ends of the LED substrate 18 along the z-axis direction. A plate surface that is on the outer side of the light source mounted portion 19a, or a plate surface on a side opposite to the plate surface on which the LED substrate 18 is mounted, faces the side wall 13b of the outer frame 13, which will be described later. In other words, the light source mounted portion 19a is interposed between the side wall 13b of the outer frame 13 and the light guide plate 16. On the light source mounted portion 19a, a screw groove (not illustrated), to which the screw member SM is inserted, is formed at a position that aligns with the screw insertion hole 13c of the side wall 13b. With this configuration, the outer frame 13 and the heat dissipation member 19 (housing member 30) are assembled via the screw members SM.

As shown in FIG. 4, the heat dissipation portion 19b takes the shape of a plate that is parallel to the plate surface of the chassis 14, with the long side direction, the short side direction, and the thickness direction thereof respectively matching the x-axis direction, the y-axis direction, and the z-axis direction. The heat dissipation portion 19b is formed so as to protrude inward along the y-axis direction from the end of the reverse side of the light source mounting portion 19a, or the end of the chassis 14 side. Additionally, while the light source mounted portion 19a is disposed on the front side of the chassis 14 (on the side of the liquid crystal panel 11), the heat dissipation portion 19b is provided on the reverse side of the chassis 14 (the opposite side of the liquid crystal panel 11). While the long side dimensions of the heat dissipation portion 19b are nearly equal to the long side dimensions of the light source mounted portion 19a, the short side dimensions and the thickness dimension of the heat dissipation portion 19b are larger than the short side dimensions and the thickness dimension of the light source mounted portion 19a. Thus, the heat dissipation portion 19b has a configuration with superior heat dissipation. The heat dissipation portion 19b is configured such that, on a reverse surface thereof, or a reverse surface 30a of the housing member 30 (a surface on a side opposite to the liquid crystal panel 11), the side closer to the light source mounted portion 19a is raised higher in a stepwise manner toward the reverse side than the side farther away from the light source mounted portion 19a (the side of the protruding end of the respective heat dissipation portion 19b). Additionally, on the reverse surface 30a of the housing member 30, in a portion of the heat dissipation portion 19b that is raised higher in a stepwise manner, a recessed section 31 is provided to fit the mounting member 40. A configuration of the recessed section 31 will be described later.

The chassis 14 is configured by a metal plate material, and assumes a horizontally long rectangular shape as a whole so as to cover the light guide plate 16 almost over the entire area from the reverse side, as shown in FIG. 3. The plate surfaces on the front side of the heat dissipation portions 19b of the heat dissipation members 19 are disposed so that the entire areas are in direct contact with the reverse surface of the chassis 14. This allows heat transmitted from the LEDs 17 to the heat dissipation portions 19b of the heat dissipation members 19 via the LED substrates 18 to be efficiently transmitted to the chassis 14, a metal member that has a larger heat capacity than the heat dissipation members 19, making it possible to further promote heat dissipation by utilizing of the heat capacity of the chassis 14. The chassis 14 is assembled with the heat dissipation members 19, and together constitute the housing member 30.

The housing member 30, as shown in FIG. 4, is configured by disposing a pair of the heat dissipation members 19 to face each other toward the inner side and by disposing the rims of both of the long sides of the chassis 14 on the respective surfaces of the heat dissipation portions 19b of the heat dissipation members 19. The housing member 30 assumes an inverted C shape from a cross-sectional view of the short side direction of the chassis 14 (the y-axis direction), forming a space where the main components of the backlight device 12 are housed. The housing member 30 is constituted by the heat dissipation members 19 and the chassis 14 that are made of metal, and is therefore higher in mechanical strength (rigidity) than if made of a synthetic resin, for example. Examples of assembly configurations of the heat dissipation members 19 and the chassis 14 include a configuration in which the heat dissipation members 19 are mounted on the outer frame 13 so that the chassis 14, along with other components, is sandwiched between the heat dissipation members 19 and the outer frame 13, and another configuration in which the chassis 14 and the heat dissipation portions 19b are secured by known methods such as screw tightening.

Next, the main parts of the present embodiment, or a configuration pertaining to the mounting members 40 and a manner in which the printed boards 25a and 25b are mounted on the housing member 30, will be described in detail. Note that the manners of mounting the printed boards 25a and 25b are identical. Therefore, while the manner of mounting the printed boards 25a will be explained below, explanation of the manner of mounting the printed boards 25b will be omitted. Additionally, the manners of mounting the mounting members 40 and the printed boards 25a at the ends of the long side direction of the backlight device 12 shown in FIG. 4 are symmetrical. Therefore, only a configuration of the left end (see FIG. 5) will be explained, and a configuration of the right end will be omitted.

Figure 7:
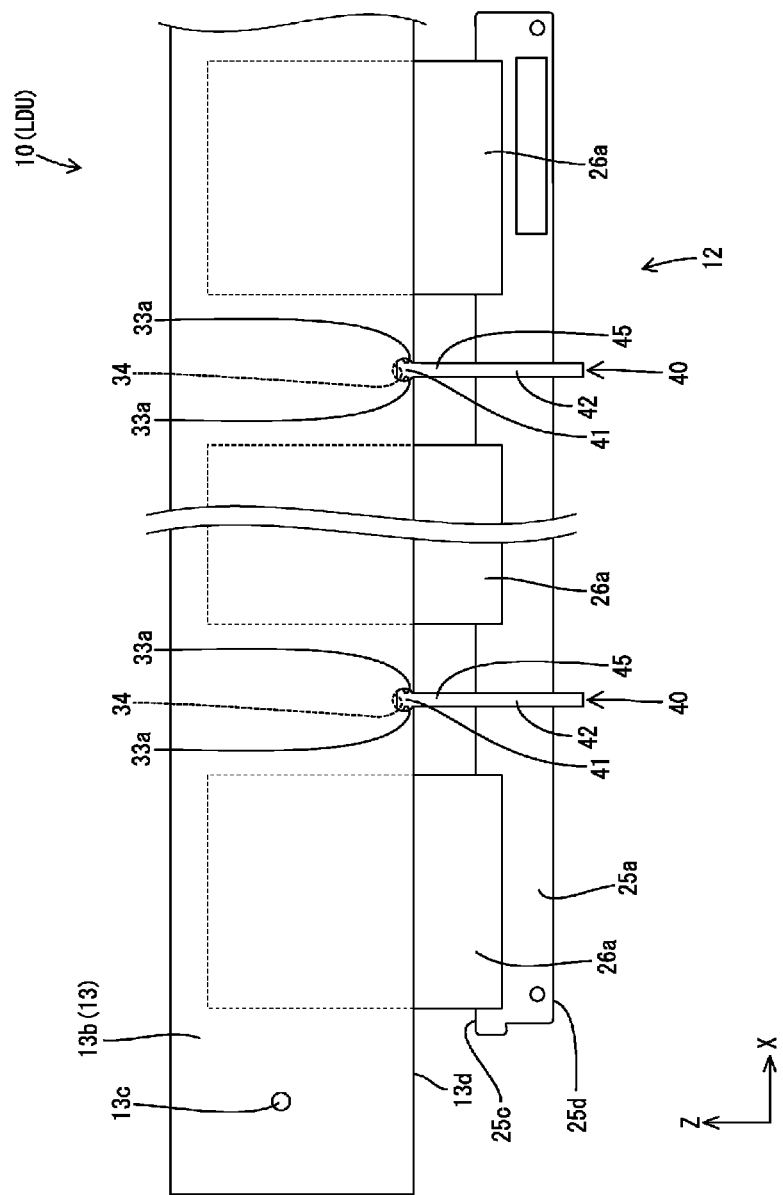
FIG. 7 is a side view of the main parts showing the mounting member 40 in the first position.

On the reverse surface 13d of the side wall 13b, a groove portion 33 that extends along a direction of rotation of the mounting member 40 (the direction along the plate thickness of the side wall 13b; the y-axis direction) is provided, as shown in FIGS. 5 and 7. The position of the groove portion 33 aligns with the recessed portion 31 provided on the housing member 30 along the x-axis direction. The groove portion 33 has a pair of side portions 33a and 33a and a bottom portion 33b. The side portion 33a assumes a curved shape that extends along a side surface of a pivot portion 41, as shown in FIG. 7. On the other hand, the bottom portion 33b is a surface that is parallel to the reverse surface 13d of the side wall 13b, as shown in FIG. 5. In the bottom portion 33b, a bearing portion 34 is provided so as to form a concave shape in the bottom portion 33b along a spherical crown of the pivot portion 41 to support the pivot portion 41 of the mounting member 40.

The recessed portion 31 is formed on the reverse surface 30a of the housing member 30 so as to be recessed along an outer surface of a fitting portion 43, which will be described later. Additionally, a part of the recessed portion 31 that opens to the reverse surface 30a of the housing member 30 is configured to be larger than the top end of the fitting portion 43. A locking protrusion 31a is formed in the recessed portion 31 so as to protrude inward from the rim of that opening to engage with a flange portion of the fitting portion 43.

The mounting member 40 is made of a synthetic resin and has an insulating property. As shown in FIG. 5, the mounting member 40 is equipped with: a base portion 45 assuming a substantially L-shaped prism; the pivot portion 41 provided on one end of the base portion 45; the housing portion 42 that houses the printed board 25a between the base portion 45 and the housing portion 42; and the fitting portion 43 provided on the other end of the base portion 45 to be fitted to the housing member 30 (recessed portion 31). The base portion 45 is configured such that one side extends along the printed board 25a, and the other side extends up along a direction perpendicular to the printed board 25a, while the printed board 25a is housed in the housing portion 42. Two mounting members 40 are provided for each printed board 25a, and for the five flexible substrates 26a connected to one printed board 25a, the mounting members 40 are provided between the flexible substrates 26a placed on both ends and the adjacent flexible substrates 26a thereof.

As shown in FIGS. 5 and 7, the pivot portion 41 is a spherical portion that is mounted on the side wall 13b in a rotatable manner. The diameter of the pivot portion 41 is larger than the width dimension of the base portion 45. Additionally, the pivot portion 41 is configured so as to be prevented from slipping in a direction perpendicular to the groove portion 33 (downward) by the pair of side portions 33a and 33a and to be prevented from slipping in a direction in which the groove portion 33 extends (the y-axis direction) by the inner surface of the bearing portion 34. This configuration allows the pivot portion 41 to be mounted on the bearing portion 34 in a rotatable manner by inserting the pivot portion 41 into the bearing portion 34, and allows the mounting member 40 to be rotated with the center of the pivot portion 41 acting as a pivot.

The housing portion 42 is a portion that locks the printed board 25a, and has a pair of locking pieces 42a and 42a that respectively lock one end 25c of the printed board 25a and another end 25d in a sandwiching manner between the housing portion 42 and the base portion 45. With the printed board 25a attached to the housing member 30, the locking pieces 42a are disposed on the side of the housing member 30 relative to the base portion 45. As shown in FIG. 7, the locking pieces 42a are locked to the printed board 25a at portions between mutually adjacent flexible substrates 26a. End surfaces 42b and 42b of the pair of locking pieces 42a and 42a are tapering surfaces whose width narrows gradually in a direction toward where the printed board 25a is housed (a direction toward the base portion 45). Additionally, with respect to the pair of locking pieces 42a and 42a, the dimension of the portion where the width of the end surfaces 42b an 42b that face each other is the narrowest is slightly smaller than the width of the printed board 25a, or the dimension between the one end 25c to the other end 25d.

The fitting portion 43 is a portion that is fixed to the reverse surface 30a of the housing member 30, and is fitted to the recessed portion 31 of the housing member 30 in the direction of rotation of the mounting member 40. The fitting portion 43 has a flange portion that protrudes outward from the base portion 45 in a flange-like shape with the outer surfaces of the flange portion having a tapering shape. The diameter of the flange portion is larger than the inner diameter of the locking protrusion 31a of the recessed portion 31, making it possible to insert and lock the flange portion to the locking protrusion 31a.

Next, the manner of mounting the mounting member 40 will be described. The mounting member 40 is rotatable between a first position shown in FIG. 6 and a second position shown in FIG. 5. In the first position, the mounting member 40 is disposed such that one side of the base portion 45 is parallel to the direction in which the side wall 13b is extended (the z-axis direction), while in the second position, the mounting member 40 is disposed in a position where one side of the base portion 45 is rotated 90 degrees from the direction in which the side wall 13b is extended (a position along the y-axis direction).

First, the printed board 25a is locked to the mounting member 40 in the first position of the mounting member 40, as shown in FIG. 6. At this time, if the outer frame 13 is placed so as to be on the upper side, the printed board 25a can be housed inside the housing portion 42 in the first position of the mounting member 40 while the printed board 25a, connected to the flexible substrates 26a, is hanging down due to weight. An operator then inserts the print substrate 25a between the pair of locking pieces 42a and 42a and houses (locks) the print substrate 25a in the housing portion 42 from a side of the outer frame 13, while keeping the work at hand in view.

Next, the mounting member 40 is rotated against the side wall 13b from the first position toward a direction of the arrow shown in FIG. 6. At this time, the printed board 25a is locked to the housing portion 42, and the mounting member 40 is rotated from the first position while the flexible substrates 26a are being bent. During this time, when a force applies to the mounting member 40 in a direction perpendicular to the direction of rotation, the base portion 45 interferes with the pair of side portions 33a and 33a, and the movement of the mounting member 40 to the direction perpendicular to the direction of rotation is restricted. For this reason, even if the operator is not able to view the position of the recessed portion 31 of the housing member 30, the positions of the fitting portion 43 and the recessed section 31 match in the second position.

Then, as shown in FIG. 5, the mounting member 40 is rotated to the second position to fit (fix) the fitting portion 43 to the recessed portion 31 of the housing member 30. Specifically, by pressing the fitting portion 43 into the recessed portion 31, the flange portion of the fitting portion 32 is latched to the locking protrusion 31a of the recessed portion 31, and the fitting portion 43 is fitted to the recessed portion 31 such that the fitting portion 43 is prevented from slipping. As a result, the printed board 25a is positioned by the inner surface of the housing portion 42, and the mounting member 40 is mounted to the housing member 30. In this manner, the mounting of the printed board 25a to the housing member 30 is completed.

The liquid crystal display device 10 pertaining to the present embodiment includes: the LEDs 17; the liquid crystal panel 11 that realizes display using light from the LEDs 17; the printed boards 25 that control a display operation of the liquid crystal panel 11; the flexible substrates 26 having flexibility that electrically connect the liquid crystal panel 11 and the printed boards 25; the housing member 30 that is disposed on the side opposite to the display surface 11c where the display of the liquid crystal panel 11 is realized and that houses at least the LEDs 17; the frame-shaped outer frame 13 that holds, in a sandwiching manner, at least the liquid crystal panel 11 between the outer frame 13 and the housing member 30, the outer frame 13 having the panel pressing section 13a that is disposed on the display surface 11c side and that presses the liquid crystal panel 11 from the display surface 11c side, and the side wall 13b that extends from the panel pressing section 13a to the side of the housing member 30; and the mounting members 40 that are mounted on the side wall 13b in a rotatable manner and that mount the printed boards 25 on the housing member 30, the respective mounting member 40 being rotatable between the first position, where the printed board 25 is locked, and the second position, where the mounting member 40 is fixed to the surface 30a of the housing member 30 that is on the side opposite to the liquid crystal panel 11, by rotating the mounting member 40 from the first position against the side wall 13b by bending the flexible substrates 26, while the printed board 25 is kept in a locked state.

According to the liquid crystal display device 10 described above, the mounting member 40 that mounts the printed board 25 on the housing member 30 is rotatable between the first position and the second position. As a result, even if the printed board 25 is mounted on the housing member 30 while the surface 30a of the housing member 30 on the side opposite to the liquid crystal panel 11 is difficult to see, it is possible to perform the work of locking the printed board 25 to the mounting member 40 while the work at hand is visible in the first position, where the printed board 25 is locked, and to fix the mounting member 40 to the surface 30a of the housing member 30 on the side opposite to the liquid crystal panel 11 by rotating the mounting member 40 against the side wall 13b to the second position. This makes it possible to achieve excellent workability for fixing the printed board 25 to the housing member 30.

Consequently, when the liquid crystal display device 10 is assembled while the liquid crystal panel 11 side is easy to see, it is not necessary to invert the liquid crystal display device 10 during assembly to make the surface 30a of the housing member 30 on the side opposite to the liquid crystal panel 11 easier to see while the printed board 25 is mounted on the housing member 30, thereby preventing an occurrence of a situation where the printed board 25, the flexible substrate 26, or the like is damaged as a result of inverting the liquid crystal display device 10 during assembly.

Further, according to the present embodiment, the printed board 25 can be mounted on the back surface side of the housing member 30 in a suitable manner even when the liquid crystal display device 10 is large, in which case inverting is particularly difficult during assembly. This makes it possible to mount the printed board 25 on the housing member 30 even if the liquid crystal display device 10 is large, and contribute to the narrowing of the frame of the liquid crystal device 10.

Additionally, in the present embodiment, the movement of the mounting member 40 is restricted in the direction perpendicular to the direction of rotation between the first position and the second position. With this configuration, it is possible to further improve workability for fixing the mounting member 40 on the surface 30a of the housing member 30 on the side opposite to the liquid crystal panel 11.

Additionally, in the present embodiment, the portion of the mounting member 40 mounted on the side wall 13b in a rotatable manner is the spherical pivot portion 41, and the bearing portion 34 supporting the pivot portion 41 is provided on the surface 30a of the side wall 13b on the side opposite to the panel pressing section 13a. With this configuration, it is possible to mount the mounting member 40 on the side wall 13b in a rotatable manner in an easy configuration.

Additionally, in the present embodiment, the grooved portion 33 extending in the direction of rotation of the mounting member 40 and having the pair of side portions 33a and 33a and the bottom portion 33b is provided on the surface 13d of the side wall 13b on the side opposite to the panel pressing section 13a, and the bearing portion 34 is provided in the bottom portion 33b of the grooved portion 33. With this configuration, the side portion 33a of the grooved portion 33 is able to restrict the movement of the mounting member 40 in the direction perpendicular to the direction of rotation of the mounting member 40 between the first position and the second position.

Additionally, in the present embodiment, the portion of the mounting member 40 that is fixed to the surface 30a of the housing member 30 on the side opposite to the liquid crystal panel 11 is the fitting portion 43 that is fitted to the housing member 30 in the direction of rotation of the mounting member 40. With this configuration, it is possible to fix the mounting member 40 to the housing member 30 via the fitting portion 43 by rotating the mounting member 40 from the first position to the second position, and further improve workability for mounting the printed board 25 to the housing member 30.

Additionally, in the present embodiment, the portion of the mounting member 40 that locks the printed board 25 is the housing portion 42 that houses the respective printed board 25, and the housing portion 42 has the base portion 45 and the pair of locking pieces 42a and 42a that respectively lock the one end 25c and the other end 25d of the printed board 25 in a sandwiching manner between the pair of locking pieces 42a and 42a and the base portion 45. With this configuration, it is possible to lock the printed board 25 to the mounting member 40 in an easy configuration.

Additionally, in the present embodiment, the housing portion 42 is capable of housing the printed board 25 in the first position while the respective printed board 25 that is connected to the flexible substrates 26 is hanging down due to weight. With this configuration, it is possible to house the printed board 25 in the housing portion 42 easily and achieve excellent workability for locking the printed board 25 to the mounting member 40.

Additionally, in the present embodiment, a plurality of flexible substrates 26 are connected to the printed board 25 along the one end 25c in a parallel manner, and the locking pieces 42a lock the printed board 25 at portions between the flexible substrates 26 adjacent to each other. With this configuration, it is possible to avoid a situation where the flexible substrate 26 and the mounting member 40 interfere with each other.

Additionally, in the present embodiment, the end surfaces 42b and 42b of the pair of locking pieces 42a and 42a facing each other have tapering surfaces that gradually become narrower in a direction toward where the printed board 25 is housed. With this configuration, it is possible to house the printed board 25 in the housing portion 42 even more easily and achieve excellent workability for locking the printed board 25 to the mounting member 40.

Additionally, also included in the present embodiment is the frame-shaped inner frame 22 that is interposed between the liquid crystal panel 11 and the housing member 30 and that has the panel supporting surface 22a supporting the surface 11d on the side opposite to the display surface 11c of the liquid crystal panel 11. The flexible substrates 26 are connected to the respective liquid crystal panel 11 on the one panel surface 11e of the liquid crystal panel 11, and the inner frame 22 protrudes from the panel supporting surface 22a, with the protruding end 22c thereof disposed in the same plane as the one panel surface 11e and the wiring supporting portion 22b supporting the flexible substrates 26. With this configuration, it is possible to prevent an unforeseeable load from being applied to the connecting portions between the liquid crystal panel 11 and the flexible substrates 26 by having the wiring supporting portion 22b support the flexible substrates 26, and to improve the reliability of connection between the liquid crystal panel 11 and the flexible substrates 26.

Additionally, in the present embodiment, while the mounting member 40 is disposed along the direction in which the side wall 13b is extended in the first position, the mounting member 40 is disposed in a position rotated 90 degrees from the direction in which the side wall 13b is extended in the second position. With this configuration, it is possible to mount the printed board 25 on the housing member 30 in an easy configuration, and further improve workability for mounting the printed board 25 on the housing member 30.

Additionally, in the present embodiment, the liquid crystal panel 11 is used as an example of a display panel. Such a display device can be used as the liquid crystal display device 10 in a wide variety of applications, including displays for television sets and personal computers, and is particularly suitable for large-screen displays.

<Embodiment 2>

Figure 8:
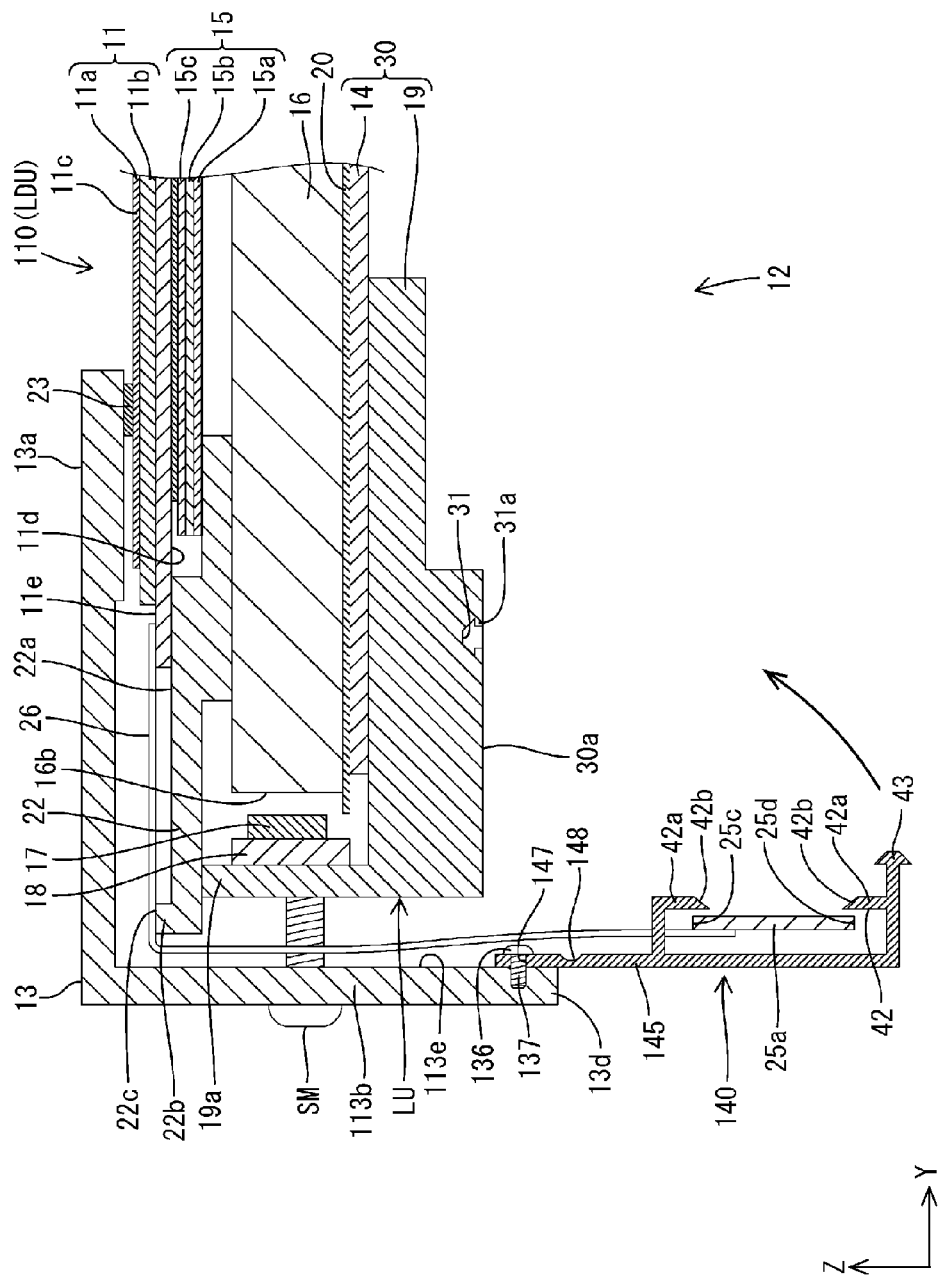
FIG. 8 is a cross-sectional view of the main parts of a liquid crystal display device 110 pertaining to Embodiment 2 showing a cross-sectional configuration along a short side direction thereof, with a mounting member 140 in a first position.

Embodiment 2 of the present invention will be described using FIG. 8. In Embodiment 2, a manner of mounting a mounting member 140 to a side wall 113b and a configuration that allows the mounting member 140 to be rotatable against the side wall 113b are different from those of Embodiment 1. Here, overlapping descriptions of the structures, mechanisms, and effects that are identical to those of Embodiment 1 described above will be omitted.

On an end portion of the side wall 113b on a side opposite to a panel pressing section 13a, a screw groove 137, where a small screw 136 is inserted, is provided on a side surface 113e facing a light source mounted portion 19a of a heat dissipation member 19. The position of the screw groove 137 aligns with a recessed portion 31 provided on a housing member 30 along the x-axis direction.

A mounting member 140 is made of a synthetic resin and has an insulating property. The mounting member 140 is equipped with: a base portion 145 assuming a substantially L-shaped plate; a mounting portion 147 provided on the side of one end of the base portion 145; a rotatable portion 148 provided in a vicinity of the mounting portion 147 and on a side opposite to the one end relative to the mounting portion 147; the housing portion 42 that houses a printed board 25 between the base portion 145 and the housing portion 42; and the fitting portion 43 provided on the other end of the base portion 145 to be fitted to the housing member 30 (recessed portion 31). The base portion 145 is configured such that one side extends along the printed board 25 and the other side extends up along a direction perpendicular to the printed board 25, while the printed board 25 is housed in the housing portion 42.

The mounting portion 147 is an insertion hole in which the shaft portion of the small screw 136 can be inserted. The mounting member 140 can be mounted on the side wall 113b by aligning the mounting portion 147 and the screw groove 137 and inserting the small screw 136 into the side wall 113b.

The rotatable portion 148 is a thin portion of the base portion 145, and the plate thickness thereof is made thinner along a direction of the width of the base portion 145 (the x-axis direction). With this configuration, when the mounting member 140 is maneuvered in a direction of rotation, force concentrates on the rotatable portion 148, and the mounting member 140 rotates with the rotatable portion 148 acting as a pivot. Since the base portion 145 has a plate shape, and a thin portion is formed along the direction of the width of the base portion 145 (the x-axis direction), the movement of the mounting member 140 is restricted in a direction perpendicular to the direction of rotation between a first position and a second position.

In the present embodiment, the portion of the mounting member 140 that is mounted on the side wall 113b in a rotatable manner is constituted by the mounting portion 147 and the rotatable portion 148. Additionally, the mounting member 140 is configured such that the mounting portion 147 is mounted on the side wall 113b via the small screw 136 and is rotated with the rotatable portion 148, a thin portion, acting as a pivot. With this configuration, the mounting member 140 can be mounted in a rotatable manner against the side wall 113b in an easy configuration.

<Embodiment 3>

Figure 9:
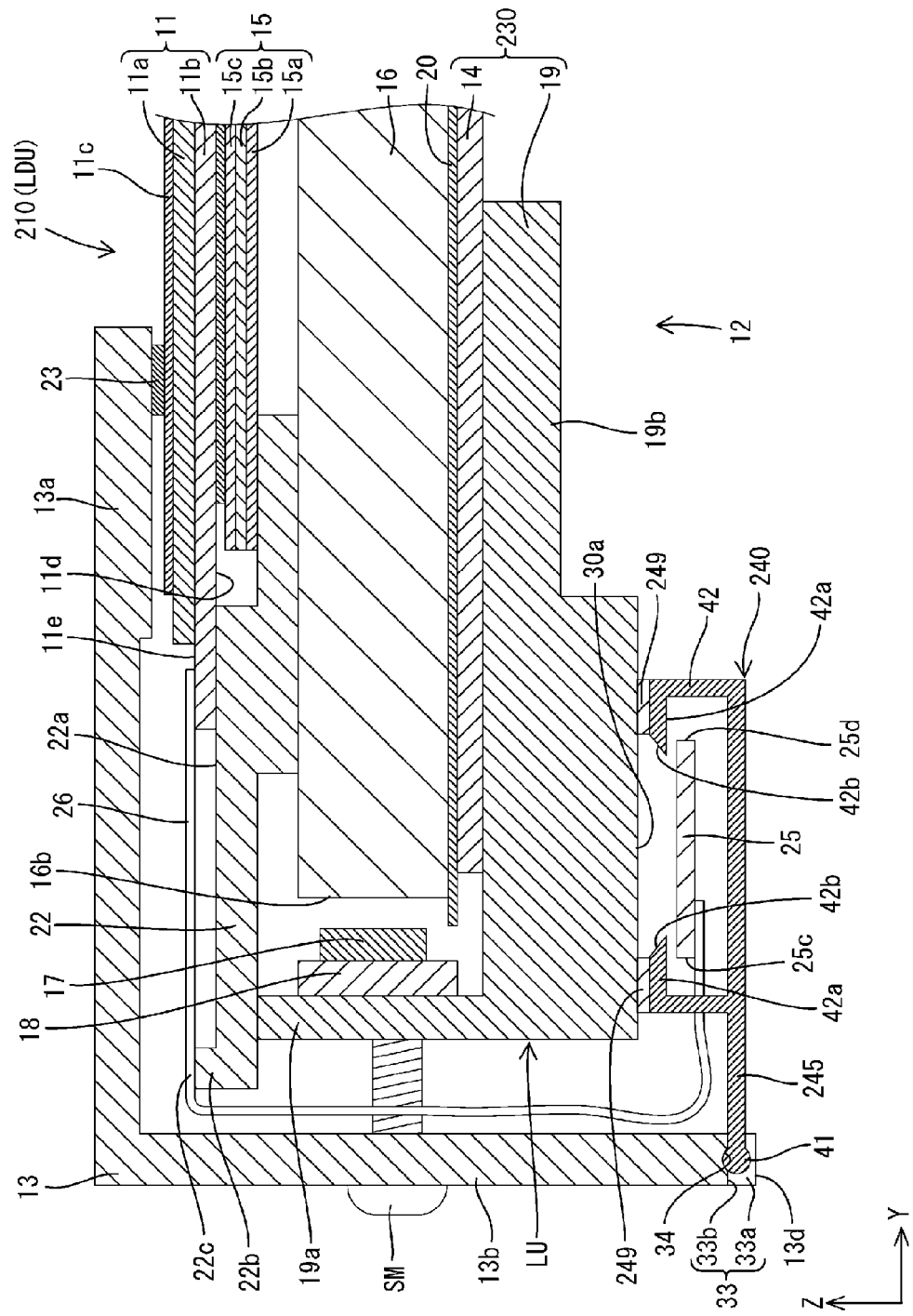
FIG. 9 is a cross-sectional view of the main parts of a liquid crystal display device 210 pertaining to Embodiment 3, showing a cross-sectional configuration of the liquid crystal display device 210 along a short side direction thereof using an enlarged view of a vicinity of one LED unit LU (with a mounting member 240 in a second position).

Embodiment 3 of the present invention will be described using FIG. 9. In Embodiment 3, the manner of mounting a mounting member 240 on a surface 30a of a housing member 230 on a side opposite to a liquid crystal panel 11 is different from those of Embodiment 1. Here, overlapping descriptions of the structures, mechanisms, and effects that are identical to those of Embodiment 1 described above will be omitted.

A housing member 230 is a flat surface portion on which a reverse surface 30a, a surface on a side opposite to the liquid crystal panel 11, contacts the surfaces of a pair of locking pieces 42a and 42a of the mounting member 240 that are on a side opposite to a base portion 245 via adhesive layers 249, which will be described later. In other words, no recessed portion is provided in the housing member 230, unlike Embodiment 1.

A mounting member 240 is made of a synthetic resin and has an insulating property. The mounting member 240 is equipped with: a base portion 245 assuming a substantially L-shaped prism; a pivot portion 41 provided on one end of the base portion 245; a housing portion 42 that houses a printed board 25 between the base portion 245 and the housing portion 42; and adhesive layers 249 that are provided on surfaces of the housing member 42 that are on the side opposite to the base portion 245.

The adhesive layers 249 are portions that are fixed against the reverse surface 30a of the housing member 230, and are bonded respectively to the surface 30a of the housing member 230 on a side opposite to the liquid crystal panel 11 and the pair of locking pieces 42a and 42a.

In the present embodiment, the mounting member 240 is secured to the surface 30a of the housing member 230 on a side opposite to the liquid crystal panel 11 via the adhesive layers 249. With this configuration, the mounting member 240 can be mounted to the housing member 230 in an easy configuration.

<Other Embodiments>

The present invention is not limited by the embodiments explained and described above with reference to diagrams. Embodiments such as those described below, for example, also fall within the technical scope of the present invention.

(1) In each of the embodiments described above, configurations pertaining to a pivot portion, a mounting portion, and a rotatable portion were used as examples of a configuration of a mounting member that is mounted on a side wall in a rotatable manner. However, the present invention is not limited by these examples, and the mechanisms of rotation against the side wall and the mounting units may be modified accordingly.

(2) In each of the embodiments described above, a fitting portion and adhesive layers were used as examples of a configuration in which a mounting member is fixed to a surface of a housing member on a side opposite to the display panel. However, the present invention is not limited by these examples. Fixing by clip(s), double-sided tape(s), or magnet(s) is also acceptable, and the fixing units may be modified accordingly.

(3) In each of the embodiments described above, a housing portion was used as an example of a configuration of a portion where a mounting member is locked to a driver board. However, the present invention is not limited by this example. The locking units, the locking positions of the printed board, and the layout and configuration of the respective locking positions may be modified accordingly.

(4) The number of units, the geometry, the layout and the like of a mounting member may be modified accordingly from those described in each of the embodiments above.

(5) In each of the embodiments described above, a configuration of a housing member constituted by heat dissipation members and a chassis was used as an example. However, the present invention is not limited by this example. A housing member may be constituted by a chassis only, provided that a light source is included.

(6) In each of the embodiments described above, a configuration in which heat dissipation members are provided on a side of the chassis opposite to the liquid crystal panel was used. However, a configuration in which heat dissipation members are provided on the liquid crystal panel side of the chassis also falls within the scope of the present invention.

(7) In each of the embodiments described above, a configuration in which a mounting member is mounted on a heat dissipation member of a housing member was used as an example. However, a configuration in which the mounting member is mounted on a chassis is also acceptable.

(8) In each of the embodiments described above, a configuration in which each of the printed boards 25a and 25b is mounted on the housing member 30 using the mounting members was used as an example. However, a configuration in which only one of the printed boards 25a and 25b is mounted on the housing member 30 is also acceptable. Additionally, a configuration in which one of the printed boards 25a and 25b is not included also falls within the scope of the present invention.

(9) In each of the embodiments described above, a liquid crystal display device using a liquid crystal panel as a display panel was used as an example. However, the present invention is also applicable to other display devices using other types of display panels.

(10) In each of the embodiments described above, a configuration in which LED units (LED substrates) are disposed in a pair such as to respectively face the edges of the long sides of the light guide plate was shown. However, a configuration in which LED units are disposed in a pair so as to respectively face the edges of the short sides of the light guide plate, for example, also falls within the scope of the present invention.

(11) Other than (10) above, a configuration in which two pairs of LED units (LED substrates), a total of four units, are provided so as to respectively face the edges of both of the long sides and both of the short sides of the light guide plate, or a configuration in which one is provided to face the edge of one of the long sides or the edge of one of the short sides of the light guide plate is also within the scope of the present invention. Additionally, a configuration in which LED units are provided such as to face the edges of any three sides of a light guide plate also falls within the scope of the present invention.

(12) In each of the embodiments described above, a configuration in which two LED units (LED substrates) are provided for each side of a light guide plate was shown. Configurations in which one LED unit or three or more LED units are provided for each side of the light guide plate are also acceptable.

(13) In each of the embodiments described above, an LED was used as a light source. However, an organic EL or other light sources may also be used.

(14) In the embodiments described above, an edge-lit type backlight device equipped with a light guide plate was used as an example. However, the configuration of the backlight device may be modified accordingly. For example, a backlight that is not equipped with a light guide plate and that directly supplies light from the back surface of the liquid crystal panel (a so-called direct-lit type) may also be used.

Thus, the embodiments of the present invention were described above in detail, but these specific examples are illustrative, and not limiting the scope of the claims. The technical scope defined by the claims includes various modifications of the specific examples described above.

| Description of Reference Characters | |
|---|---|
| TV | television receiver |
| LDU | liquid crystal display unit |
| PWB | power supply board |
| MB | main board |
| CTB | control board |
| CV | cover member |
| ST | stand |
| LU | LED unit |
| 10, 110, 210 | liquid crystal display device (display device) |
| 11 | liquid crystal panel (display panel) |
| 11c | display surface |
| 11d | surface on a side opposite to the display surface |
| 11e | one panel surface |
| 12 | backlight device |
| 13 | outer frame (frame) |
| 13a | panel pressing section |
| 13b, 113b | side wall |
| 13d | reverse surface (surface on a side opposite to the panel pressing section) |
| 14 | chassis |
| 15 | optical member |
| 16 | light guide plate |
| 16a | light exiting surface |
| 16b | light incident surface |
| 17 | LED |
| 18 | LED substrate |
| 25, 25a, 25b | printed board (driver board) |
| 25c | one end |
| 25d | other end |
| 26, 26a, 26b | flexible substrate (flexible wiring line) |
| 30, 230 | housing member |
| 30a | reverse surface (surface on a side opposite to the display panel) |
| 31 | recessed portion |
| 33 | grooved portion |
| 33a | side portion |
| 33b | bottom portion |
| 34 | bearing portion |
| 40, 140, 240 | mounting member |
| 41 | pivot portion |
| 42 | housing portion |
| 42a | locking piece |
| 42b | end surface |
| 43 | fitting portion |
| 45, 145, 245 | base portion |
| 136 | small screw |
| 137 | screw groove |
| 147 | mounting portion |
| 148 | rotatable portion |
| 249 | adhesive layer |

What is claimed is:

1. A display device, comprising:
a light source;
a display panel that displays an image with light from said light source;
a driver board that controls display operation of said display panel;
flexible wiring that electrically connect said display panel to said driver board;
a housing member that is disposed on a side opposite to a display surface side of said display panel where said display is realized and that houses at least said light source;
a frame that holds, in a sandwiching manner, at least said display panel between said frame and said housing member, said frame having a panel pressing section that is disposed on said display surface side and that presses said display panel from said display surface side, and a side wall that extends from said panel pressing section to a side of said housing member; and
a mounting member mounted on said side wall in a rotatable manner for mounting said driver board to said housing member, said mounting member being configured to rotate, with respect to said side wall, from a first position where said mounting member receives said driver board that has been connected to said flexible wiring, to a second position, where said mounting member is fixed to a rear external surface of said housing member while holding said driver board and while bending said flexible wiring, thereby mounting said driver board onto said housing member.

2. The display device according to claim 1, wherein a movement of said mounting member is restricted in a direction that is perpendicular to a direction of rotation between said first position and said second position.

3. The display device according to claim 1,
wherein a portion of said mounting member mounted on said side wall in a rotatable manner is a spherical pivot portion, and
wherein a bearing portion supporting said pivot portion is provided on a surface of said side wall on a side opposite to said panel pressing section.

4. The display device according to claim 3,
wherein a grooved portion extending in a direction of rotation of said mounting member and having a pair of side portions and a bottom portion is provided on a surface of said side wall on a side opposite to said panel pressing section, and
wherein said bearing portion is provided in said bottom portion of said grooved portion.

5. The display device according to claim 1, wherein a portion of said mounting member that is fixed to a surface of said housing member on a side opposite to said display panel is a fitting portion that is fitted to said housing member in a direction of rotation of said mounting member.

6. The display device according to claim 1,
wherein a portion of said mounting member that locks said driver board is a housing portion that houses the driver board, and
wherein said housing portion has a base portion and a pair of locking pieces that respectively lock one end of said driver board and another end of said driver broad in a sandwiching manner between said pair of locking pieces and said base portion.

7. The display device according to claim 6, wherein said housing portion houses is said driver board in said first position while the driver board that is connected to said flexible wiring is hanging down due to weight.

8. The display device according to claim 6,
wherein a plurality of said flexible wiring parallel to one another are connected to said driver board along said one end, and
wherein said locking pieces lock said driver board at portions between said flexible wiring parallel to one another.

9. The display device according to claim 6, wherein end surfaces of said pair of locking pieces facing each other have tapering surfaces that gradually become narrow in a direction toward where said driver board is housed.

10. The display device according to claim 1, further comprising:
a frame-shaped panel supporting member that is interposed between said display panel and said housing member and that has a panel supporting surface supporting a surface on a side opposite to said display surface of said display panel,
wherein said flexible wiring is connected to the respective display panel on one panel surface of said display panel, and wherein said panel supporting member protrudes from said panel supporting surface, with a protruding end thereof disposed in a same plane as said one panel surface and a wiring supporting portion supporting said flexible wiring.

11. The display device according to claim 1, wherein, in said first position, said mounting member is disposed along a direction in which said side wall is extended, and, in said second position, said mounting member is disposed in a position rotated 90 degrees from said direction in which said side wall is extended.

12. The display device according to claim 1, wherein said display panel is a display panel having liquid crystal.

13. A television receiver, comprising the display device according to claim 1.

* * * * *